Sept. 13, 1966 L. S. CUTLER 3,273,073
FREQUENCY SYNTHESIZER
Filed Feb. 19, 1964
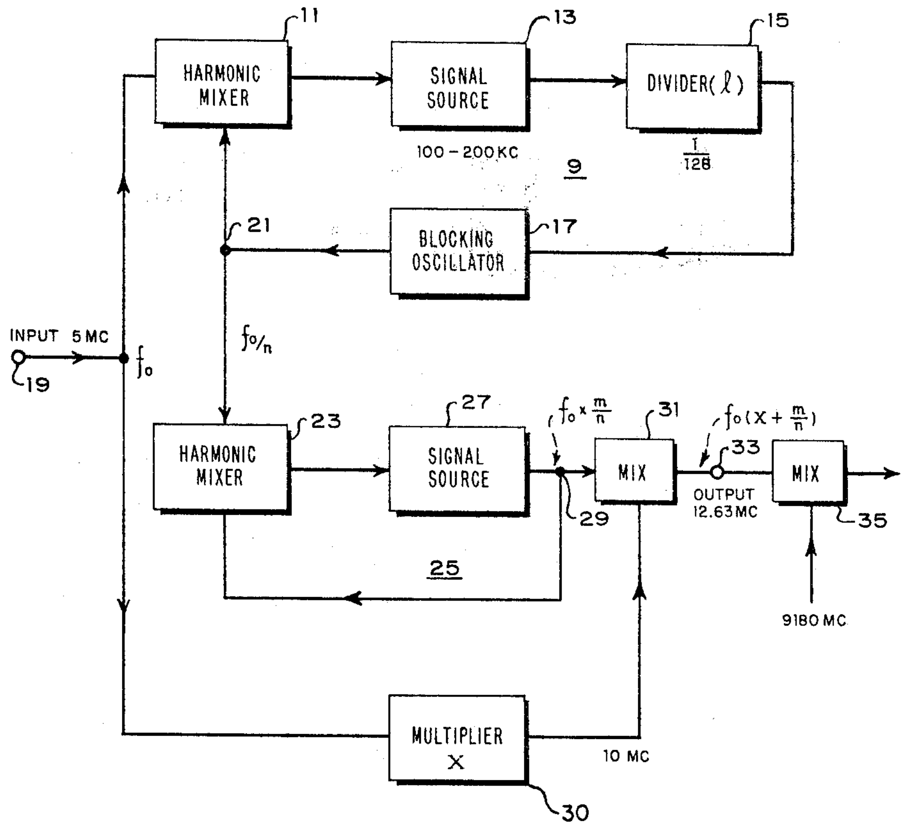
INVENTOR
LEONARD S. CUTLER
BY Q. C. Smith
AGENT United States Patent Office 3,273,073
Patented Sept. 13, 1966

3,273,073
FREQUENCY SYNTHESIZER

Leonard S. Cutler, Palo Alto, Calif., assignor to Hewlett-Packard Company, Palo Alto, Calif., a corporation of California Filed Feb. 19, 1964, Ser. No. 345,968
3 Claims. (Cl. 331—38)

This invention relates to apparatus for producing a selected frequency of a typical value from an applied frequency of standard value.

Certain frequency standards rely for frequency accurary and stability upon the atomic resonance of atoms of an element such as cesium or rhubidium. These atoms are excited by a microwave signal having a frequency which is substantially equal to the atomic-resonant frequency.

Accordingly it is an object of the present invention to provide apparatus for producing from a reference frequency of standard value a microwave signal having a frequency related to the atomic-resonant frequency of an atomic-beam frequency standard.

It is another object of the present invention to provide apparatus for producing a microwave signal frequency as a selectable multiple of a standard frequency.

In accordance with the illustrated embodiment of the present invention, a pair of phase-locked loops are cascaded to convert an applied frequency to a subharmonic frequency and then to convert the subharmonic to a selected harmonic related to the applied frequency by the ratio of two integers which may have relatively prime values.

Other and incidental objects of the invention will be apparent from a reading of this specification and an inspection of the accompanying drawing which shows a schematic diagram of the circuit of the present invention.

Referring to the drawing, there is shown a first phase-locked loop 9 including harmonic mixer 11, signal source 13, divider 15 and blocking oscillator 17. Signal appearing at input 19 is combined in mixer 11 with a subharmonic of the signal source 13. The output of mixer 11 is a control signal which alters the frequency of source 13 sufficiently to maintain phase lock between the input frequency $f_0$ and the frequency of the signal from blocking oscillator 17, which oscillator is triggered at a frequency which is decreased by $l$ from the frequency of source 13 by the divider 15. This loop 9 maintains the frequency of the blocking oscillator 17 as a subharmonic of $f_0$, say $f_0/n$.

The output 21 of the first phase-locked loop 9 (a subharmonic of $f_0$) is applied to the harmonic mixed 23 in the second phase-locked loop 25 which includes signal source 27. Harmonic mixer 23 supplies a control signal to signal source 27 to maintain phase lock between the output of source 27 and the $m$th harmonic of the output 21 of the first-phase locked loop 9. This provides a signal at the output of 27 which is equal to $m \times f_0/n$, where the values of $m$ and $n$ may be relatively prime and typically may be 2326 and 4419, respectively. The ratio of the two numbers times the input frequency $f_0$ is an atypical decimal such as 2.631817150 mc. The signal at the output 29 of the second phase-locked loop 25 is combined in mixer 31 with a multiple of the input frequency $f_0$ supplied by multiplier 30 to produce an output frequency which is equal to $m \times f_0/n + X f_0$ and which when added in mixer 35 to a carrier of 9180 megacycles is equal to the atomic-resonant frequency of cesium 133. This output frequency may thus be used to excite the atomic transitions in cesium using such apparatus as is described in "Comparison and Evaluation of Cesium Atomic Beam Frequency Standards," Holloway et al., Proceedings of the IRE, vol. 47, No. 10, page 1732, FIGURE 3.

I claim:

1. Signal apparatus comprising:
first and second harmonic mixers, each having a pair of inputs for producing an output related to the phase relationship between signals applied to the inputs thereof;
a first source of signal of variable frequency having an output which is connected to corresponding inputs of the first and second harmonic mixers for applying said signal of variable frequency thereto, said first source having an input which is connected to receive the output of the first mixer for varying the frequency of signal from said first source to maintain phase lock between a signal applied to the remaining input of the first mixer and a selected integer multiple of the signal of variable frequency from said first source;
a second source of signal of variable frequency having an output which is connected to the remaining input of the second harmonic mixer and having an input which is connected to receive the output of the second harmonic mixer for altering the frequency of signal from said second source to maintain phase lock between the signal therefrom and a selected integer multiple of the signal from said first source; and
means including the output of said second source for providing an output frequency proportional to the frequency of signal applied to said remaining input of the first harmonic mixer.

2. Signal apparatus as in claim 1 wherein:
said first source of signal includes a blocking oscillator, 3. Signal apparatus as in claim 1 wherein:
said means includes a mixer connected to receive the output from said second source and an integer multiple of the frequency of the signal applied to said remaining input of the first harmonic mixer for producing said output frequency as a modulation product of signals applied to said mixer.

References Cited by the Examiner

UNITED STATES PATENTS 2,786,140 3/1957 Lewis ---------- 331—22 X

ROY LAKE, *Primary Examiner.*

A. L. BRODY, *Assistant Examiner.*